US008959126B2

(12) United States Patent
Sagara (10) Patent No.: US 8,959,126 B2
(45) Date of Patent: Feb. 17, 2015

(54) DEVICE MANAGEMENT APPARATUS AND DEVICE MANAGEMENT METHOD

(75) Inventor: Haruki Sagara, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/228,752

(22) Filed: Sep. 9, 2011

(65) Prior Publication Data

US 2012/0072474 A1 Mar. 22, 2012

(30) Foreign Application Priority Data

Sep. 16, 2010 (JP) .................................. 2010-208139
Jul. 5, 2011 (JP) .................................. 2011-149511

(51) Int. Cl.
*G06F 12/00* (2006.01)
*G06F 17/30* (2006.01)
*G06F 3/12* (2006.01)
*G06F 9/44* (2006.01)

(52) U.S. Cl.
CPC ............ *G06F 3/1285* (2013.01); *G06F 3/1204* (2013.01); *G06F 3/1231* (2013.01); *G06F 9/4415* (2013.01)
USPC .......................................... 707/827; 707/822

(58) Field of Classification Search
None
See application file for complete search history.

(56) References Cited

U.S. PATENT DOCUMENTS

| 6,633,400 | B1 | 10/2003 | Sasaki et al. | |
| 8,154,744 | B2* | 4/2012 | Nakaju ........................ | 358/1.15 |
| 2004/0098471 | A1* | 5/2004 | Shima ........................... | 709/221 |
| 2005/0134902 | A1* | 6/2005 | Mihira et al. ................ | 358/1.15 |
| 2005/0267882 | A1* | 12/2005 | Aupperlee et al. ................ | 707/4 |
| 2006/0265661 | A1* | 11/2006 | Ball ............................... | 715/734 |
| 2007/0043805 | A1* | 2/2007 | Izaki et al. .................... | 709/201 |
| 2007/0247661 | A1 | 10/2007 | Minami et al. | |
| 2008/0262776 | A1* | 10/2008 | Yamasaki et al. ............. | 702/108 |
| 2008/0285078 | A1* | 11/2008 | Kato ............................ | 358/1.15 |
| 2009/0055581 | A1* | 2/2009 | Kim .............................. | 711/104 |
| 2009/0059279 | A1* | 3/2009 | Sakurai ........................ | 358/1.15 |

(Continued)

FOREIGN PATENT DOCUMENTS

CN 1658146 A 8/2005
JP 4243524 1/2009

(Continued)

OTHER PUBLICATIONS

Extended European Search Report issued Jul. 1, 2013 in Patent Application No. 11181289.7.
Chinese Office Action issued Nov. 1, 2013, in China Patent Application No. 201110273916.0 (with English translation).

*Primary Examiner* — Tony Mahmoudi
*Assistant Examiner* — Tuan A Pham
(74) *Attorney, Agent, or Firm* — Oblon, Spivak, McClelland, Maier & Neustadt, L.L.P.

(57) ABSTRACT

A device management apparatus is capable of communicating with a plurality of devices connected thereto via a network. The device management apparatus includes a storage unit that stores therein setting items and setting values for the devices; an acquiring unit that acquires, from each of the devices, a file describing a setting item currently set in the device and a current setting value of the setting item; a determination unit that determines whether the acquired file includes a setting item not being stored in the storage unit; and a storage controller that causes the storage unit, if the acquired file includes a setting item not being stored in the storage unit, to store therein the setting item not being stored in the storage unit and a current setting value of the setting item.

6 Claims, 11 Drawing Sheets

(56) References Cited

U.S. PATENT DOCUMENTS

2009/0119395 A1* 5/2009 Kodama ..................... 709/223
2010/0097635 A1* 4/2010 Waller et al. ................ 358/1.15
2010/0241695 A1 9/2010 Sagara

FOREIGN PATENT DOCUMENTS

| | | |
|---|---|---|
| JP | 2010-61399 | 3/2010 |
| JP | 2010-218384 | 9/2010 |
| JP | 2011-90406 | 5/2011 |

* cited by examiner

```
<?xml version="1.0" encoding="UTF-8"?>
<preference lang="en">
<datetime name="Date and time">
<timezone name="Time zone/Daylight saving time settings">
...
</timezone>
</datetime>
<email name="...">
<email name="...">
<address name="..." type="text" max="128" default="">...</address>
<reception name="...">
<protocol name="..." type="enum" enum="POP3/IMAP4/SMTP" default="POP3">...</protocol>
<enabled type="boolean" default="true">...</enabled>
<interval name="...">
<time type="int" min="2" max="1440" default="15">...</time>
</interval>
...
</reception>
</email>
</email>
<printer name="...">
...
</printer>
</preference>
```

```
<?xml version="1.0" encoding="UTF-8"?>
<preference lang="en">
  <datetime name="Date and time">
    <setting name="Date and time setting">
     <sntp name="SNTP server settings">
        :
     </sntp>
    </setting>
  </datetime>
  :
</preference>
```

FIG.7

```
<?xml version="1.0" encoding="UTF-8"?>
<preference lang="en">
<datetime name="Date and time">
<setting name="Date and time setting">
<sntp name="SNTP server settings">
  :
</sntp>
</setting>
<timezone name="Time zone/Daylight saving time settings">
...
</timezone>
</datetime>
<email name="..">
<email name="..." ...>
<address name="..." type="text" max="128" default="">...</address>
<reception name="..." ">
<protocol name="..." type="enum" enum="POP3/IMAP4/SMTP" default="POP3">...</protocol>
<interval name="..." ">
<enabled type="boolean" default="true">...</enabled>
<time type="int" min="2" max="1440" default="15">...</time>
</interval>
  ...
</reception>
  ...
</email>
</email>
<printer name="..." >
  ...
</printer>
</preference>
```

DEVICE MANAGEMENT APPARATUS AND DEVICE MANAGEMENT METHOD

CROSS-REFERENCE TO RELATED APPLICATIONS

The present application claims priority to and incorporates by reference the entire contents of Japanese Patent Application No. 2010-208139 filed in Japan on Sep. 16, 2010 and Japanese Patent Application No. 2011-149511 filed in Japan on Jul. 5, 2011.

BACKGROUND OF THE INVENTION

1. Field of the Invention

The present invention relates to a device management apparatus and a device management method for applying a setting value to a plurality of devices connected thereto via a network.

2. Description of the Related Art

Conventionally, device management apparatuses have been developed to perform setting of various setting items collectively for a plurality of devices connected thereto via a network (e.g., Japanese Patent No. 4243524). Japanese Patent No. 4243524 discloses a configuration in which, to perform setting on a plurality of devices collectively, the devices are categorized based on the capability of each of the devices, items that can be set collectively for the devices having different setting availability depending on the categories are determined, and a setting process for the items is determined. Applying this technology allows a user to perform the setting of the devices on the network with his/her terminal through the device management apparatus without going off to the devices thus managed.

However, conventional device management apparatuses including the device management apparatus disclosed in Japanese Patent No. 4243524 need to recognize fixed information related to the setting items to be set to each of the devices to be managed in advance. If a new setting item is added to a device newly launched to the market, the new setting item thus added is a setting item not being recognized by the device management apparatus. As a result, the device management apparatus cannot handle the new setting item.

SUMMARY OF THE INVENTION

It is an object of the present invention to at least partially solve the problems in the conventional technology.

According to an aspect of the present invention, there is provided a device management apparatus capable of communicating with a plurality of devices connected thereto via a network. The device management apparatus includes a storage unit that stores therein setting items and setting values for the devices; an acquiring unit that acquires, from each of the devices, a file describing a setting item currently set in the device and a current setting value of the setting item; a determination unit that determines whether the acquired file includes a setting item not being stored in the storage unit; and a storage controller that causes the storage unit, if the acquired file includes a setting item not being stored in the storage unit, to store therein the setting item not being stored in the storage unit and a current setting value of the setting item.

According to another aspect of the present invention, there is provided a device management method performed in a device management apparatus that is capable of communicating with a plurality of devices connected thereto via a network. The device management apparatus includes a storage unit that stores therein setting items and setting values for the devices. The device management method includes acquiring, from each of the devices, a setting item currently set in the device and a current setting value of the setting item; determining whether the acquired setting item is stored in the storage unit; and causing, if the acquired setting item is not stored in the storage unit, the storage unit to store therein the setting item and a current setting value of the setting item.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a device management apparatus and a device management method according to the present invention are described below in detail with reference to the accompanying drawings. The embodiments below are examples in which the present invention is applied to a device management apparatus whose target to be managed is a plurality of printing devices connected to a network.

First Embodiment

Figure 1:
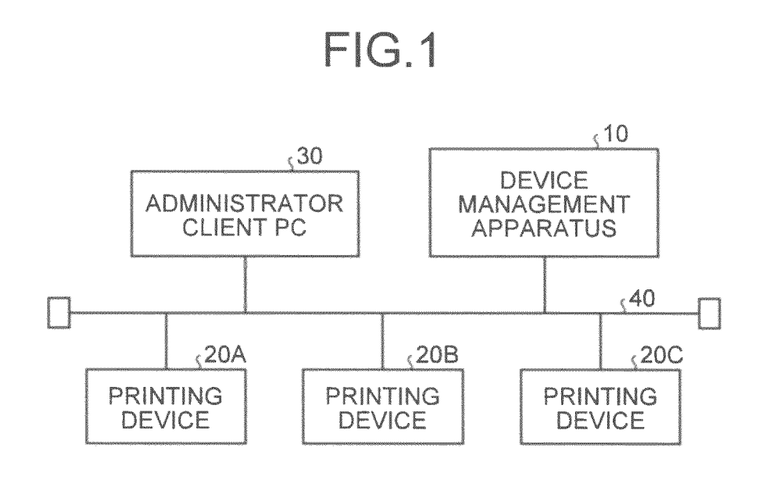
FIG. 1 is a system configuration diagram schematically illustrating an entire configuration of a device management system.

FIG. 1 is a system configuration diagram schematically illustrating an entire configuration of a device management system including a device management apparatus according to a first embodiment. The device management system is configured by connecting a device management apparatus 10, a plurality of printing devices (three printing devices in the example illustrated in FIG. 1) 20A to 20C, and an administrator client PC 30 via a network 40, such as a local area network (LAN).

The device management apparatus 10 is an apparatus that manages the printing devices 20A to 20C via the network 40.

The printing devices 20A to 20C perform printing based on print data that is input via the network 40 or directly. Each of the printing devices 20A to 20C has a function to output a file describing setting items currently set in the device, capability information of the setting items, and current setting values of the setting items in accordance with a specified format, and a function to receive a file described in accordance with a specified format from the device management apparatus 10, and to rewrite a setting value based on the content of the file thus received. If the printing devices 20A to 20C are referred to collectively, they are represented as a printing device 20 hereinbelow.

The administrator client PC 30 is a personal computer (external device) used by a user (administrator). The administrator client PC 30 has a function to display a user interface (UI) screen, which will be described later, provided from the device management apparatus 10 via the network 40, a function to receive a change request of a setting value on the UI screen, a function to transmit the file acquired from the printing device 20 to the device management apparatus 10, and other functions.

Figure 2:
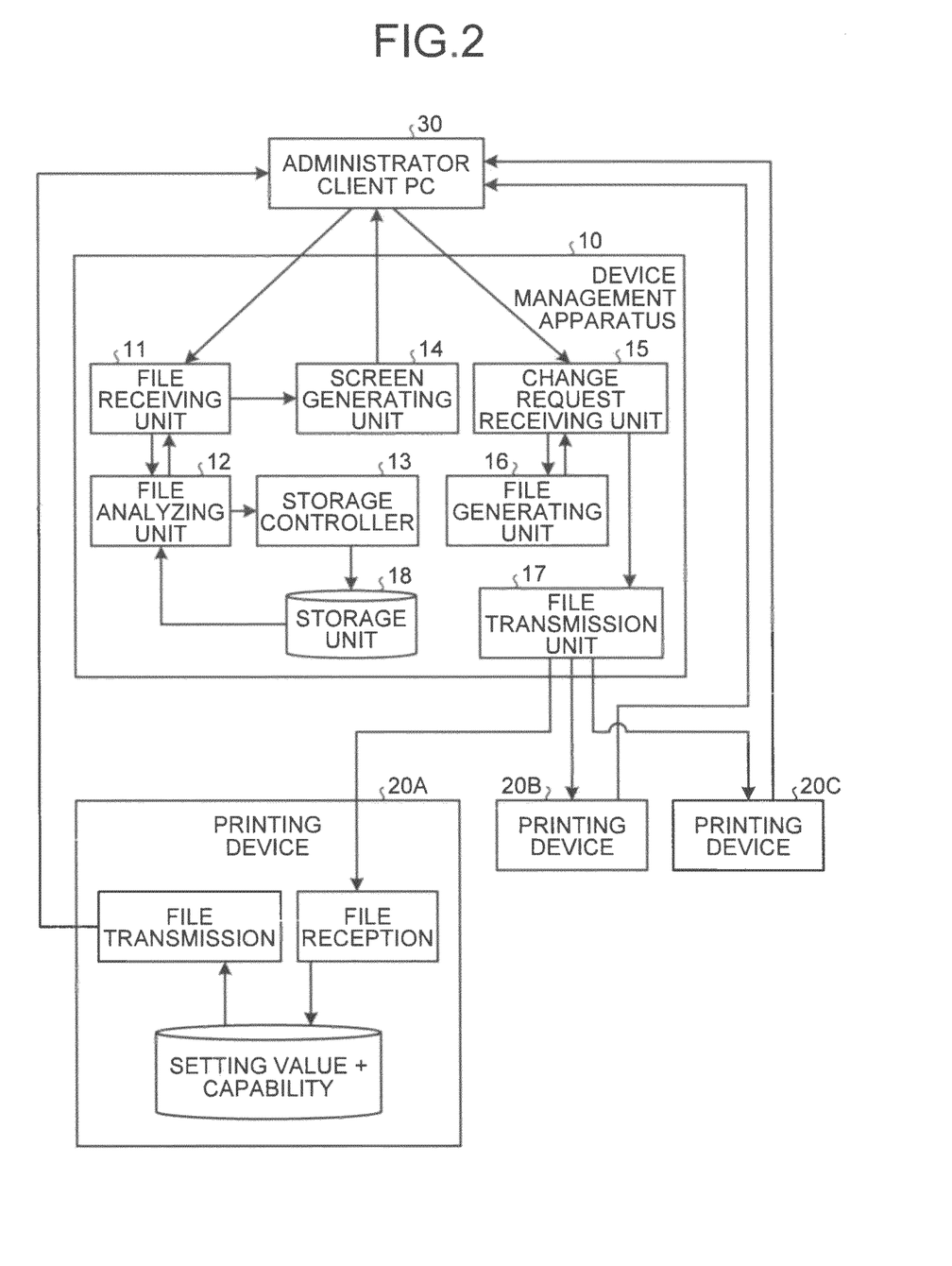
FIG. 2 is a functional block diagram of a functional configuration of a device management apparatus according to a first embodiment.

FIG. 2 is a functional block diagram of a functional configuration of the device management apparatus 10 according to the first embodiment. In the device management apparatus 10 according to the first embodiment, a hardware configuration using a typical computer can be employed. The hardware configuration includes a control device such as a central processing unit (CPU), a storage device such as a read-only memory (ROM) and a random access memory (RAM), and an external storage device such as a hard disk drive (HDD) and a compact disk (CD) drive. As illustrated in FIG. 2, a device management program executed by the computer can implement a functional configuration of a file receiving unit (acquiring unit) 11, a file analyzing unit (determination unit) 12, a storage controller 13, a screen generating unit 14, a change request receiving unit (instructing unit) 15, a file generating unit 16, and a file transmission unit 17. Furthermore, the device management apparatus 10 can implement a storage unit 18 illustrated in FIG. 2 using the external storage device.

The storage unit 18 stores therein information including various setting items, capability information, and setting values for each printing device 20 to be managed. In the storage unit 18, information related to default setting items for each printing device 20 is stored when the device management system commences operation. If a new item is added as a setting item of the printing device 20 to be managed by the device management apparatus 10 thereafter, such as the case where a new function is added to the printing device 20 to be managed, or the case where the printing device 20 having a new function is newly incorporated as a target to be managed, the information stored in the storage unit 18 is updated with new information by the storage controller 13, which will be described later.

The file receiving unit 11 receives a file describing information including setting items currently set in the printing device 20, capability information of the setting items, and current setting values of the setting items. The file is input from the administrator client PC 30, for example. In other words, the administrator client PC 30 outputs a file acquisition request to the printing device 20, and the printing device 20 outputs the file in response to the file acquisition request. When the administrator client PC 30 acquires the file output from the printing device 20 to input the file to the device management apparatus 10, the file receiving unit 11 receives the file. The capability information used herein means information related to an acceptable range of the setting value as an available setting value of the setting item. A specific example of the information described in the file will be explained later.

The file analyzing unit 12 reads the file received by the file receiving unit 11, and analyzes the information including the setting items, the capability information of the setting items, and the current setting values of the setting items described in the file. The file analyzing unit 12 then determines whether the file received by the file receiving unit 11 includes information of a setting item not being stored in the storage unit 18.

If the file analyzing unit 12 determines that the file received by the file receiving unit 11 includes information of a setting item not being stored in the storage unit 18, the storage controller 13 causes the storage unit 18 to store therein the setting item not being stored in the storage unit 18, and the capability information and the setting value of the setting item.

If a setting value is rewritten in the printing device 20 to be a target in accordance with an instruction to rewrite the setting value from the change request receiving unit 15, which will be described later, the storage controller 13 may cause the storage unit 18 to store therein the setting value thus rewritten.

In accordance with the content of the file analyzed by the file analyzing unit 12, the screen generating unit 14 dynamically generates the UI screen on which the current setting values of the setting items being set in the printing device 20 are displayed, and through which a change request for changing the setting value can be input. If the file receiving unit 11 receives a plurality of files acquired from a plurality of printing devices 20, the screen generating unit 14 generates the UI screen with a content obtained by merging the setting items and the capability information of the printing devices 20 based on the analysis result of each of the files analyzed by the file analyzing unit 12. The UI screen generated by the screen generating unit 14 can be displayed by the administrator client PC 30 as described above. The user inputs the change request for changing the setting value being set in the printing device 20 on the UI screen displayed by the administrator client PC 30.

The change request receiving unit 15 receives the change request input by the user on the UI screen generated by the screen generating unit 14. Based on the change request thus received, the change request receiving unit 15 performs various types of processing for instructing the printing device 20, which is a target of the change request, to rewrite the setting value. Specifically, the change request receiving unit 15 requests the file generating unit 16 to generate a file for instructing the rewrite of the setting value, and requests the file transmission unit 17 to transmit the file generated in the file generating unit 16.

In response to the request from the change request receiving unit 15, the file generating unit 16 generates a file describing the rewrite instruction of the setting value in accordance with the change request input by the user on the UI screen in a format processable by the printing device 20 to be the target of the change request. For the format processable by the printing device 20, a format that can be handled by the printing device 20 to be managed may be specified in advance in the design phase. Alternatively, by using a known technique such as XML style sheet language translations (XSLT), for example, the rewrite instruction of the setting value described in a predetermined format may be converted dynamically into a format that can be handled by the printing device 20 to be managed.

In response to the request from the change request receiving unit 15, the file transmission unit 17 transmits the file generated in the file generating unit 16 to the printing device 20 to be the target of the change request. The printing device 20 that receives the file rewrites the setting value in accordance with the instruction described in the file.

Sequential processing performed by the device management apparatus 10 according to the first embodiment will now be described. First, processing performed while the device management apparatus 10 receives a file, generates a UI screen, and causes the administrator client PC 30 to display the UI screen will be described.

Figure 3:
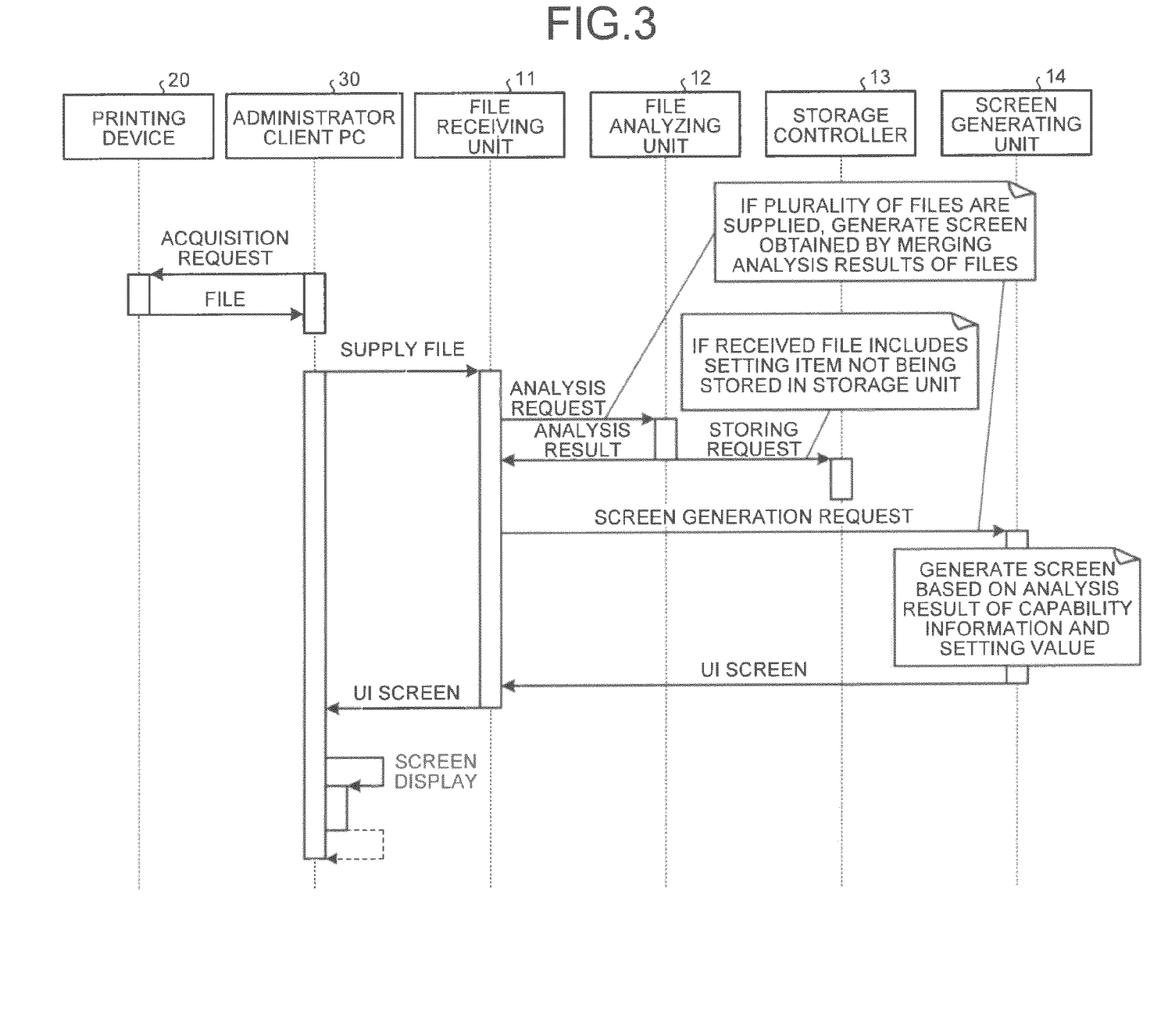
FIG. 3 is a sequence diagram illustrating processing performed by the device management apparatus while the device management apparatus receives a file, generates a user interface (UI) screen, and causes an administrator client PC to display the UI screen.

FIG. 3 is a sequence diagram illustrating processing performed by the device management apparatus 10 while the device management apparatus 10 receives a file, generates a UI screen, and causes the administrator client PC 30 to display the UI screen. In the first embodiment, the administrator client PC 30 supplies a file to the device management apparatus 10. In the file, information including setting items currently set in the printing device 20, capability information of the setting items, and current setting values of the setting items is described. Therefore, the user needs to output in advance an acquisition request of the file from the administrator client PC 30 to the printing device 20 on which the setting is to be performed, and to acquire the file transmitted from the printing device 20 in response to the acquisition request.

Figure 4:
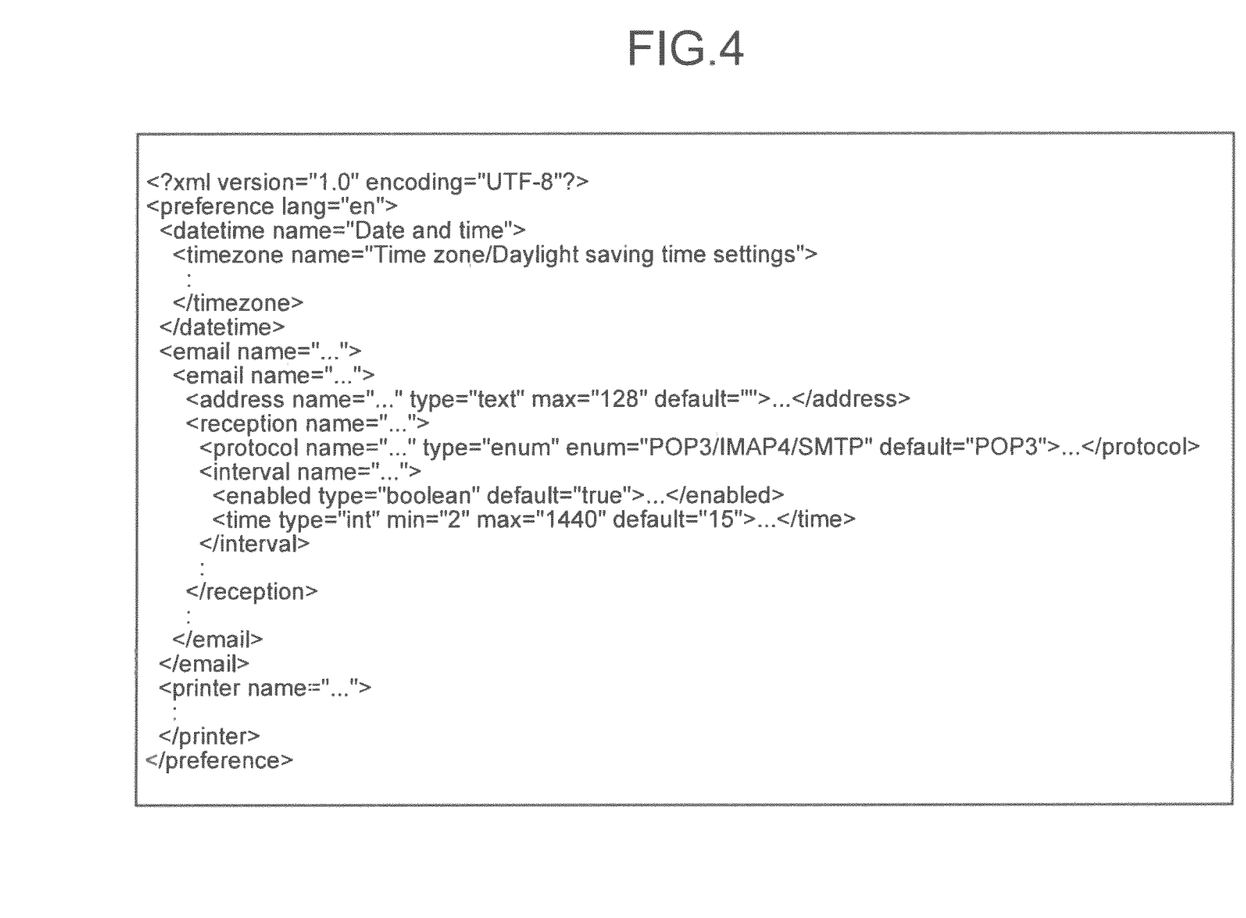
FIG. 4 is a schematic of an example of a file received by a file receiving unit of the device management apparatus.

As described above, in the file acquired by the administrator client PC 30 from the printing device 20, the information including the setting items currently set in the printing device 20, the capability information of the setting items, and the current setting values of the setting items is described. The capability information is a range of the setting value as an available setting value (an upper limit, a lower limit, and a default value). String lengths, displayed names, and the like related to the setting items are also described in the file. Furthermore, the setting items are categorized (e.g., setting items related to the printer and setting items related to the date and time) in the printing device 20, and information related to the categories of the setting items is also described in the file. If the file is in the XML format, for example, the information related to the categories can be described in the format. FIG. 4 illustrates an example of the file.

In the file exemplified in FIG. 4, "name" in a tag of <email name>, a tag of <address name>, or other tags represents a displayed name of a setting item. ' . . . ' in a tag of <email name=" . . . "> represents a current setting value for a setting item "email". Furthermore, "min", "max", and "default" in a tag of <time type="int"min="2"max="1440"default="15"> represent the capability information of the setting item.

The administrator client PC 30 that acquires the file from the printing device 20 supplies the acquired file to the device management apparatus 10. The file is received by the file receiving unit 11 of the device management apparatus 10. When receiving the file from the administrator client PC 30, the file receiving unit 11 requests the file analyzing unit 12 to analyze the file. At this time, if a plurality of files are received, the file receiving unit 11 requests analyses for the number of the files.

The file analyzing unit 12 reads the file requested to be analyzed by the file receiving unit 11, analyzes the setting items, the capability information, and the setting values described therein, and returns an analysis result to the file receiving unit 11 serving as the originator of the request. Furthermore, the file analyzing unit 12 refers to the storage unit 18, and determines whether the file thus analyzed includes a setting item not being stored in the storage unit 18. If the file analyzing unit 12 determines that the file includes a setting item not being stored in the storage unit 18, the file analyzing unit 12 requests the storage controller 13 to cause the storage unit 18 to store therein the setting item, and the capability information and the current setting value of the setting item.

In response to the request from the file analyzing unit 12, the storage controller 13 causes the storage unit 18 to store therein the setting item not being stored in the storage unit 18, and the capability information and the current setting value of the setting item.

When receiving the analysis result of the file from the file analyzing unit 12, the file receiving unit 11 requests the screen generating unit 14 to generate the UI screen in accordance with the analysis result of the file.

Figure 5:
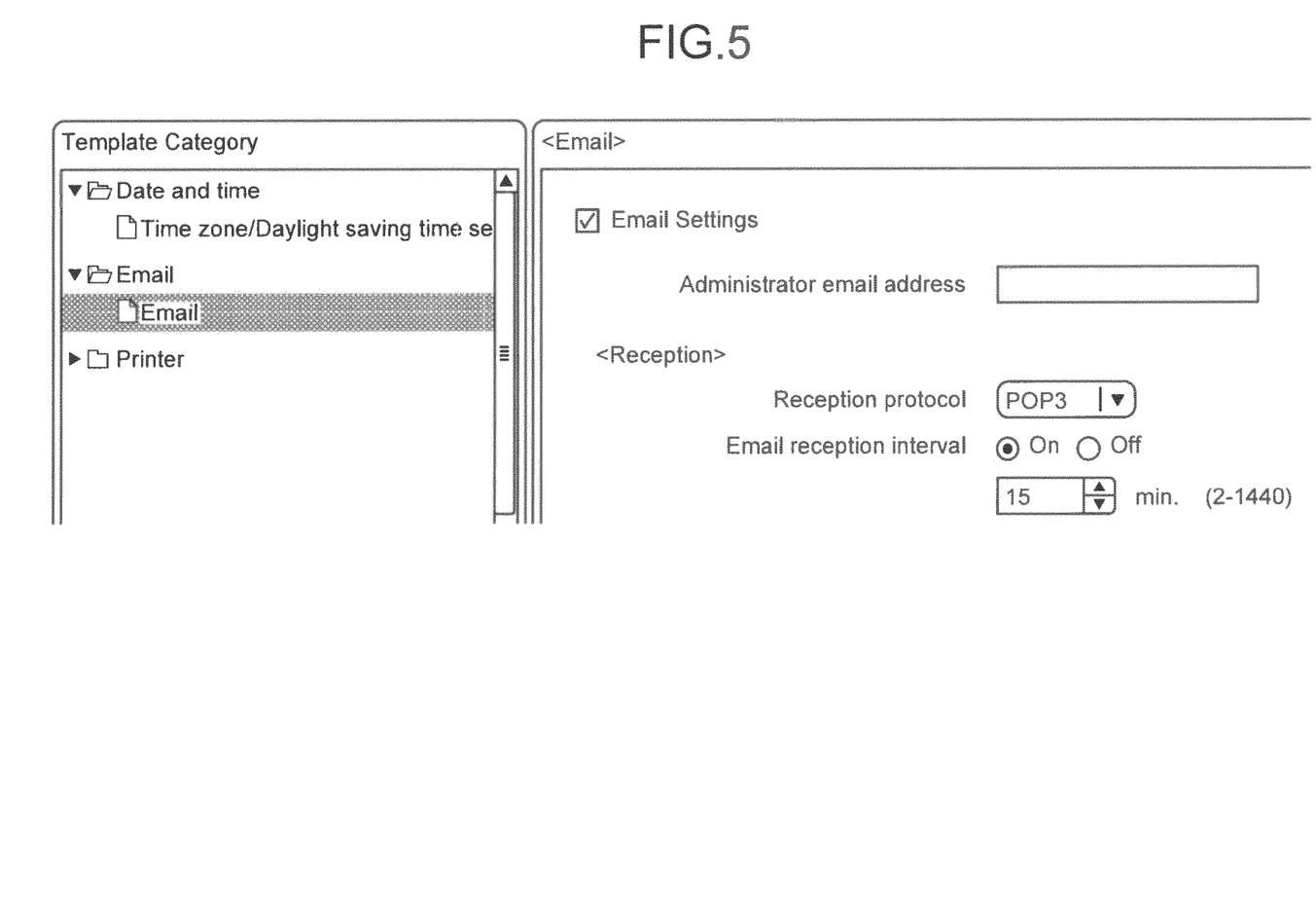
FIG. 5 is a schematic of an example of the UI screen generated by a screen generating unit of the device management apparatus.

Based on the analysis result of the file, the screen generating unit 14 generates the UI screen on which the current setting values of the setting items of the printing device 20 are displayed, and through which a change request for changing the currently setting value can be input. For example, the UI screen illustrated in FIG. 5 is generated. The UI screen generated by the screen generating unit 14 is displayed on the administrator client PC 30.

Figure 6:
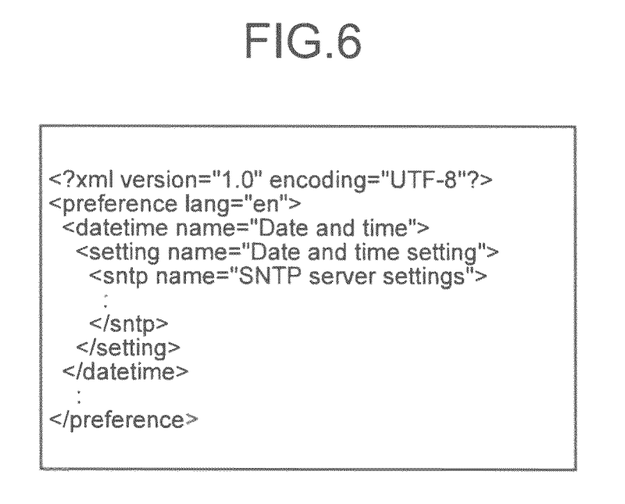
FIG. 6 is a schematic of another example of the file received by the file receiving unit of the device management apparatus.
Figure 7:
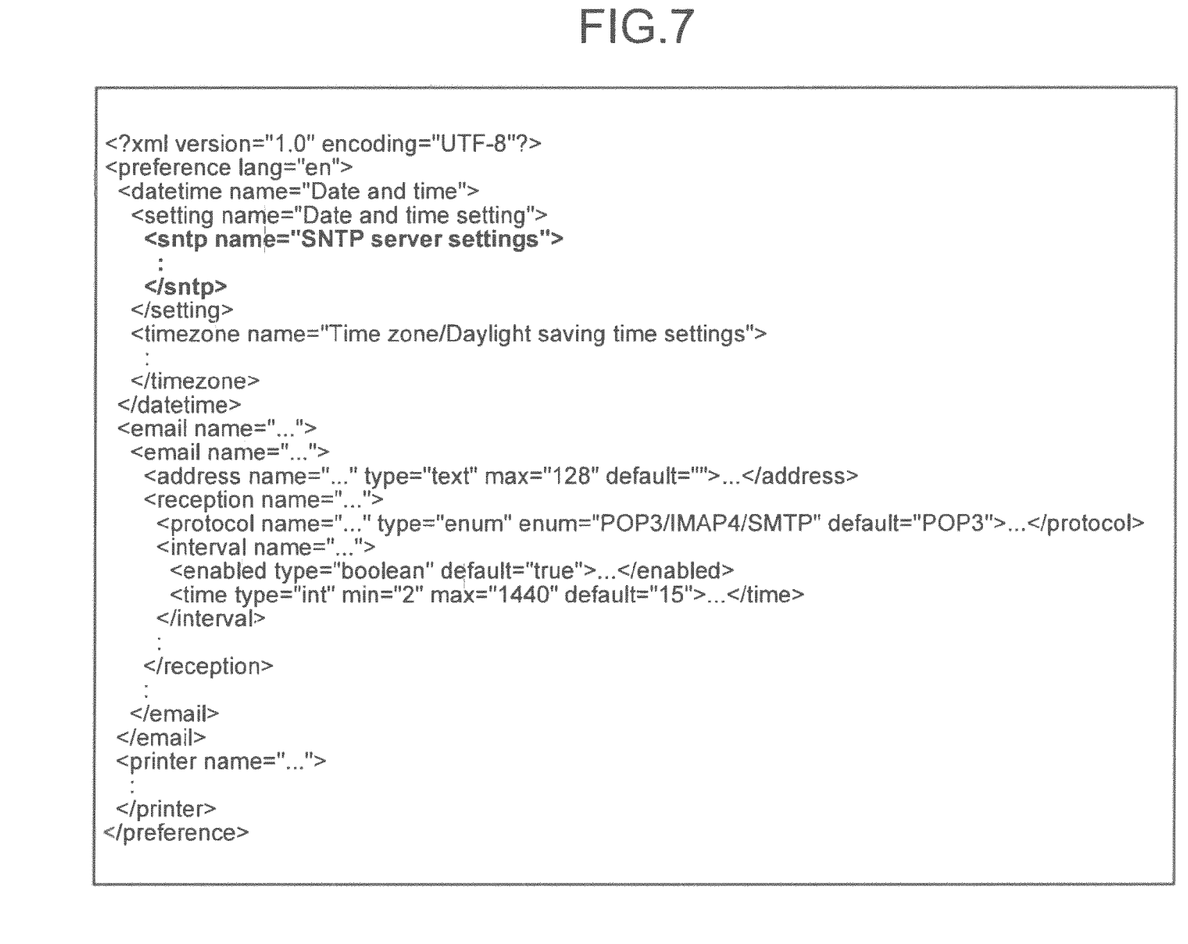
FIG. 7 is a schematic of a file generated by merging the file illustrated in FIG. 4 and the file illustrated in FIG. 6.
Figure 8:
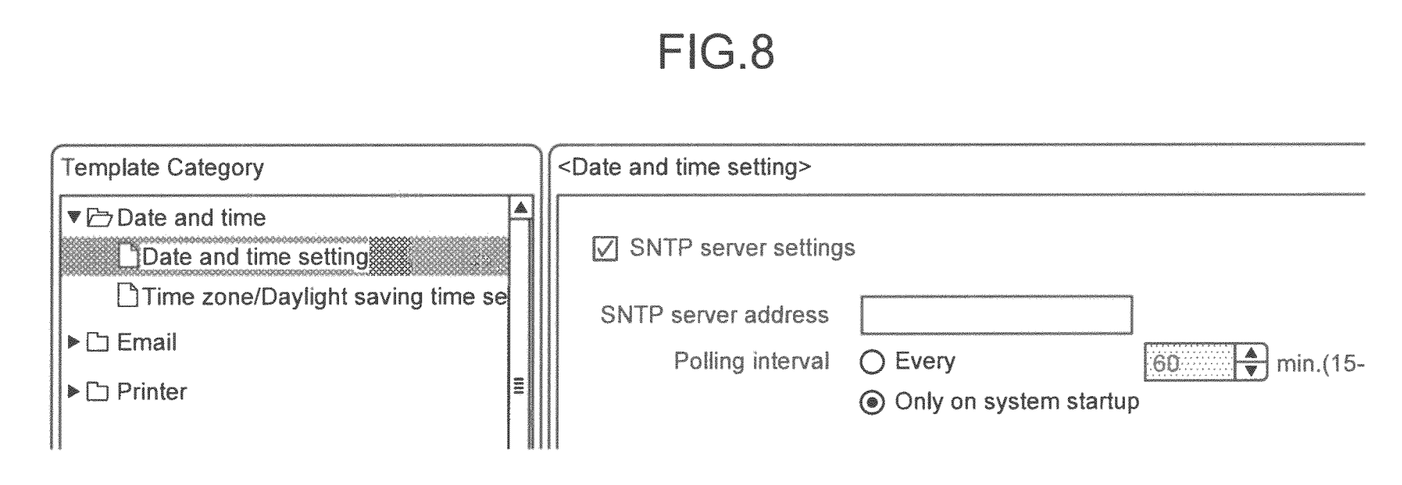
FIG. 8 is a schematic of an example of the UI screen generated based on an analysis result of the file illustrated in FIG. 7.

At this time, if analysis results of the plurality of files are present, the screen generating unit 14 generates the UI screen obtained by merging the setting items and the capability information in the files. For example, the screen generating unit 14 merges the information described in the file illustrated in FIG. 4 with the information described in the file illustrated in FIG. 6. In this case, difference between the file in FIG. 4 and the file in FIG. 6 is obtained, and information not having been present in the file in FIG. 4 is incorporated in the file in FIG. 4, thereby providing a file illustrated in FIG. 7. In the file illustrated in FIG. 7, a setting item related to a Simple Network Time Protocol (SNTP) server not being described in the original file illustrated in FIG. 4 is added. At this time, the setting item is added with the information of the category retained. As a result, the screen generating unit 14 generates the UI screen through which a change request related to the SNTP server can be input as illustrated in FIG. 8. If the information merged this time is stored, the information can be reused during the next execution. In addition, if a setting item is newly added, the information can be further merged therewith.

Figure 9:
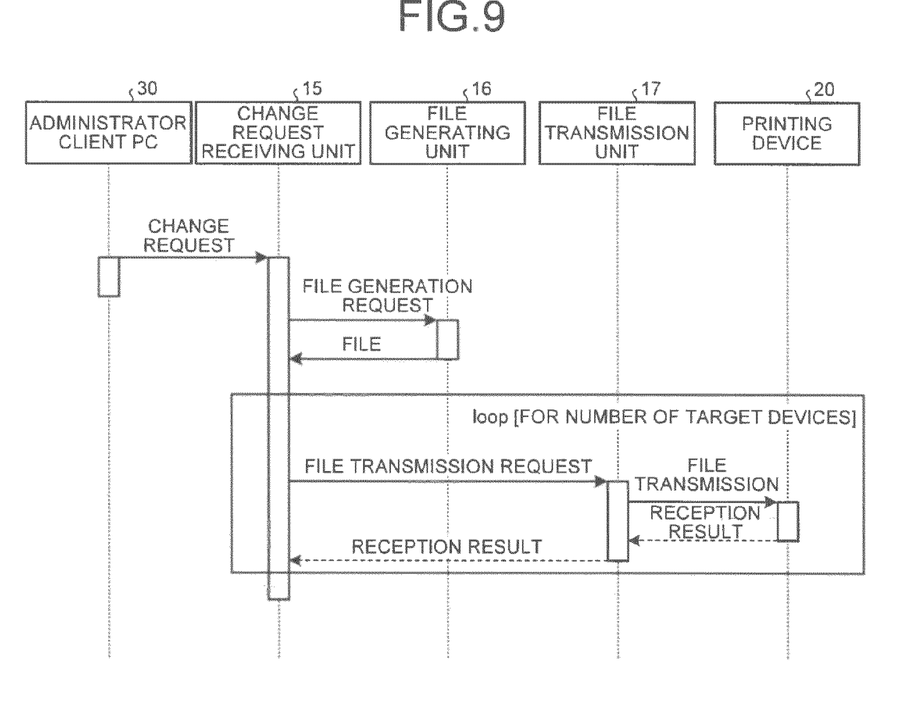
FIG. 9 is a sequence diagram illustrating processing performed by the device management apparatus while the device management apparatus receives a change request, and causes a printing device to rewrite a setting value.

Processing performed while the device management apparatus 10 receives a change request input by the user on the UI screen displayed on the administrator client PC 30, and causes the printing device 20 to rewrite a setting value in accordance with the change request will now be described. FIG. 9 is a sequence diagram illustrating processing performed by the device management apparatus 10 while the device management apparatus 10 receives the change request, and causes the printing device 20 to rewrite the setting value.

The user inputs, on the UI screen displayed on the administrator client PC 30, the change request for changing the setting value being set in the printing device 20. The change request input by the user on the UI screen includes, in addition to the value to be set, designation of the printing device 20 to be the target of the change request.

The change request input by the user on the UI screen is received by the change request receiving unit 15 of the device management apparatus 10. When receiving the change request, the change request receiving unit 15 requests the file generating unit 16 to generate a file.

Based on the content of the change request received by the change request receiving unit 15, the file generating unit 16 generates a file describing information for instructing the printing device 20 designated by the user to perform rewrite of the setting value thus requested in a format processable by the printing device 20. The file generating unit 16 then returns the file thus generated to the change request receiving unit 15 serving as the originator of the request.

When receiving the file thus generated from the file generating unit 16, the change request receiving unit 15 requests the file transmission unit 17 to transmit the file to the printing device 20 to be the target of the change request.

In response to the request from the change request receiving unit 15, the file transmission unit 17 transmits the file generated by the file generating unit 16 to the printing device 20 to be the target of the change request. At this time, if there are a plurality of the printing devices 20 to be the targets of the change request, the file transmission unit 17 transmits the file to each of the printing devices 20 to be the target. When receiving the file transmitted from the device management apparatus 10, the printing device 20 to be the target of the change request returns a file reception result to the device management apparatus 10, and rewrites the setting value in accordance with the rewrite instruction of the setting value described in the file thus received.

As described above, the device management apparatus 10 according to the first embodiment receives the file describing setting items currently set in the printing device 20 to be managed and current setting values of the setting items. If the file thus received includes a setting item not being stored in the storage unit 18, the device management apparatus 10 causes the storage unit 18 to store therein the setting item and the current setting value of the setting item. Therefore, even if the printing device 20 to which a setting item is added is incorporated as a target to be managed, or even if a setting item is newly added because of version upgrade of the printing device 20 that has already been the target to be managed, the device management apparatus 10 according to the first embodiment can appropriately manage the printing device 20 to which the new setting item is added.

Furthermore, the device management apparatus 10 according to the first embodiment generates the UI screen to which the change request for changing the setting value being set in the printing device 20 to be managed is input based on the file thus received, and causes the administrator client PC 30 to display the UI screen. The device management apparatus 10 then transmits the file generated based on the change request input through the UI screen to the printing device 20 to be managed, and causes the printing device 20 to rewrite the setting value in accordance with the change request. Therefore, the user who uses the printing device 20 can change the setting value being set in the printing device 20 used in an extremely simple manner.

Second Embodiment

A second embodiment will now be described. The second embodiment is an example in which the device management apparatus 10 acquires a file from the printing device 20 designated by the user. In the file, information including setting items currently set in the printing device 20, capability information of the setting items, and current setting values of the setting items is described. Other configuration and processing details are the same as those in the first embodiment. Therefore, explanation overlapped with that of the first embodiment will be omitted below, and a characteristic section of the present embodiment alone will be explained.

Figure 10:
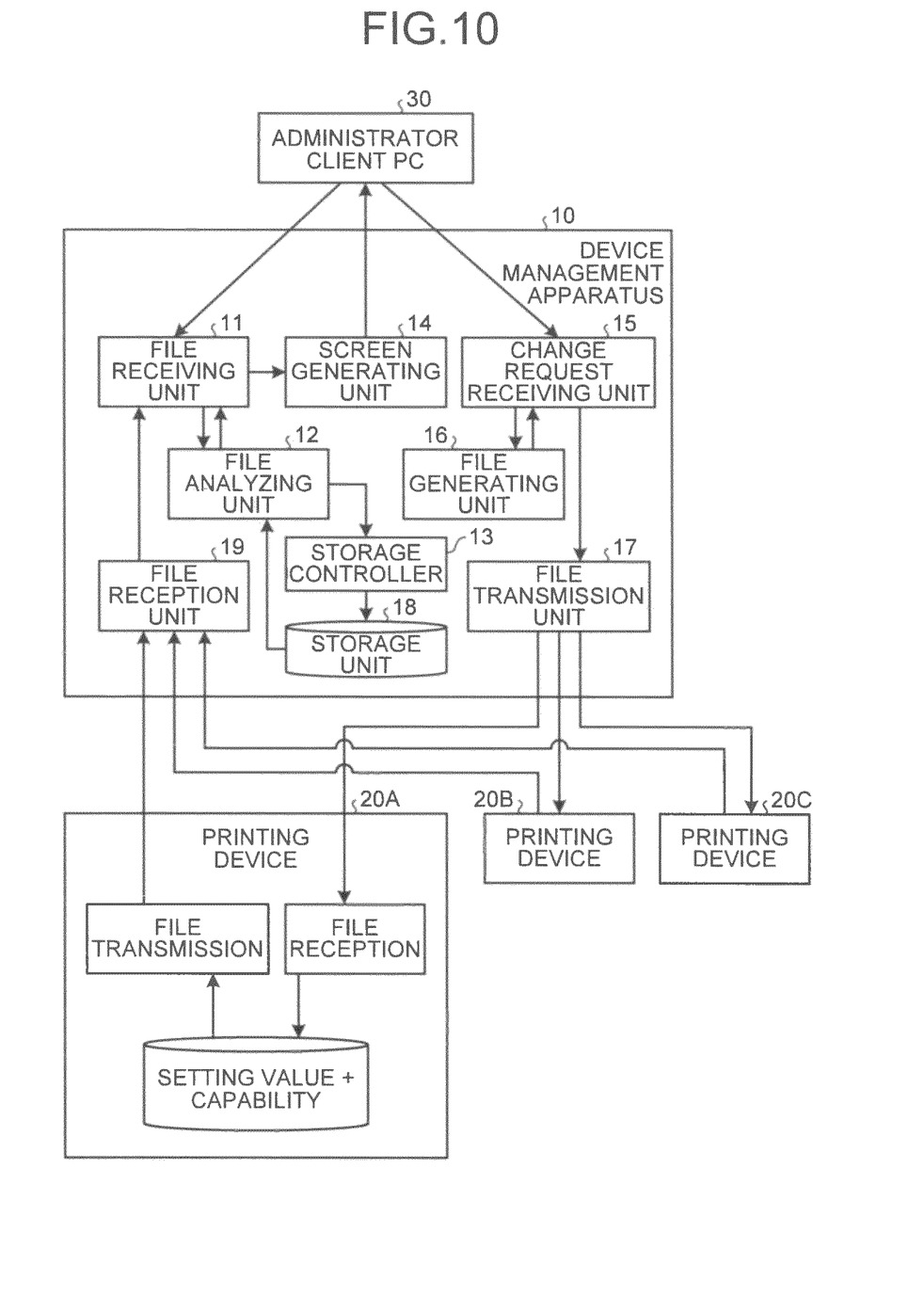
FIG. 10 is a functional block diagram of a functional configuration of a device management apparatus according to a second embodiment.

FIG. 10 is a functional block diagram of a functional configuration of the device management apparatus 10 according to the second embodiment. In the device management apparatus 10 according to the second embodiment, a file reception unit 19 is added to the configuration of the first embodiment (refer to FIG. 2).

The file reception unit 19 outputs a file acquisition request to the printing device 20 designated by the user, and receives the file transmitted from the printing device 20 in response to the file acquisition request to supply the file to the file receiving unit 11.

In the second embodiment, if a particular printing device 20 is designated by the user, the file receiving unit 11 receives the file that is supplied from the designated printing device 20 and then acquired by the file reception unit 19. The file analyzing unit 12 analyzes the file received by the file receiving unit 11 in the same manner as in the first embodiment. If the file includes a setting item not being stored in the storage unit 18, the storage controller 13 causes the storage unit 18 to store therein information including the setting item, the capability information, and the current setting value. The screen generating unit 14 generates a UI screen based on the analysis result of the file by the file analyzing unit 12.

Figure 11:
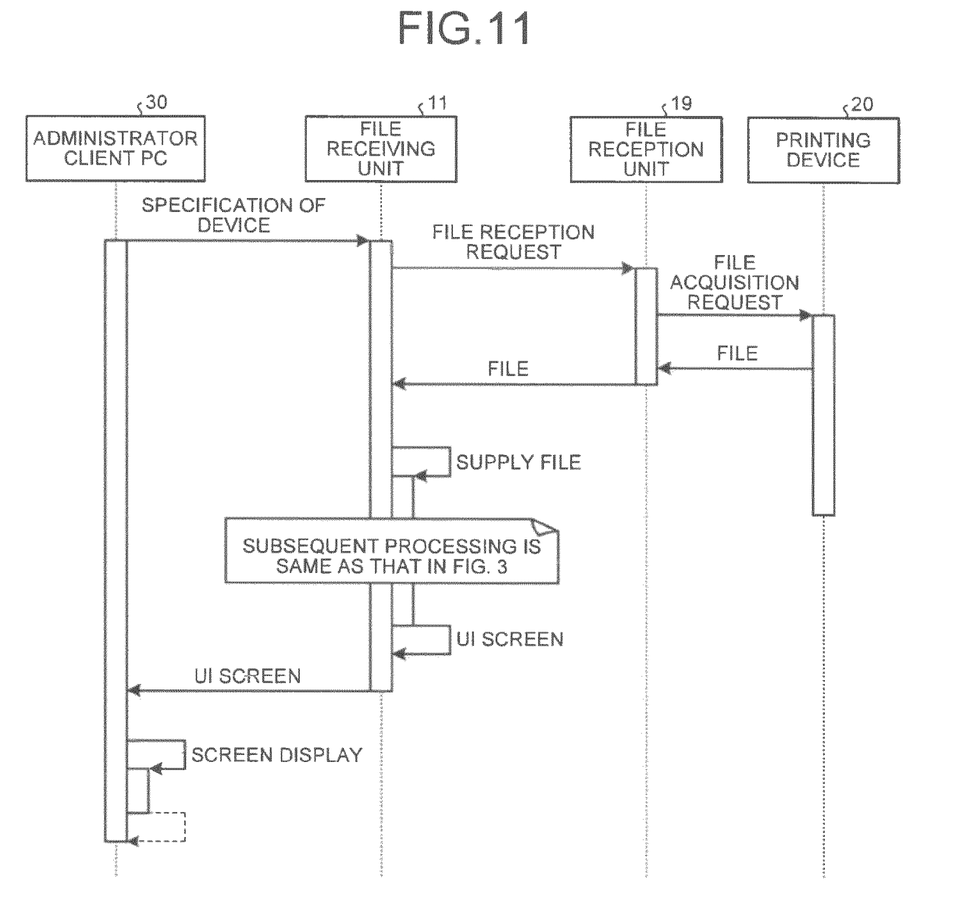
FIG. 11 is a sequence diagram illustrating processing performed by the device management apparatus while the device management apparatus receives a file, generates a UI screen, and causes the administrator client PC to display the UI screen.

FIG. 11 is a sequence diagram illustrating processing while the device management apparatus 10 receives a file, generates a UI screen, and causes the administrator client PC 30 to display the UI screen among the processing performed by the device management apparatus 10 according to the second embodiment. In the second embodiment, when the administrator client PC 30 designates the printing device 20 from which the file is to be acquired for the file receiving unit 11 of the device management apparatus 10, the file receiving unit 11 requests the file reception unit 19 to receive the file of the printing device 20. At this time, if a plurality of printing devices 20 are designated as the targets from which the file is to be acquired, the file receiving unit 11 requests the reception of the file for the number of the printing devices 20.

In accordance with the request from the file receiving unit 11, the file reception unit 19 outputs the file acquisition request to the printing device 20 designated as the target from which the file is to be acquired, and receives the file transmitted from the printing device 20 in response to the file acquisition request. The file reception unit 19 then supplies the file transmitted from the printing device 20 to the file receiving unit 11. At this time, if the file receiving unit 11 requests the reception of the files from a plurality of printing devices 20, the file reception unit 19 outputs the file acquisition request to each of the designated printing devices 20. The file reception unit 19 then receives the file from each of the printing devices 20 to supply the file to the file receiving unit 11.

Processing performed after the file receiving unit 11 receives the file acquired by the file reception unit 19 is the same as that in the device management apparatus 10 according to the first embodiment illustrated in FIG. 3. Furthermore, processing performed while the device management apparatus 10 receives a change request, transmits the file to the printing device 20, and causes the printing device 20 to rewrite a setting value is the same as that in the device management apparatus 10 according to the first embodiment illustrated in FIG. 9.

As described above, the device management apparatus 10 according to the second embodiment acquires the file describing the information including the setting items currently set in the printing device 20, the capability information of the setting items, and the current setting values of the setting items from the printing device 20 designated by the user. Therefore, the user need not acquire the file from the printing device 20 in advance. As a result, the user can perform operations such as change of the setting value of the printing device 20 thus used in a simpler manner.

The device management program executed in the device management apparatus 10 according to the embodiments is provided in a manner recorded in a computer-readable recording medium, such as a compact disk read-only memory (CD-ROM), a flexible disk (FD), a compact disk recordable (CD-R), and a digital versatile disk (DVD), as a file in an installable or an executable format, for example.

The device management program executed in the device management apparatus 10 according to the embodiments may be provided in a manner stored in a computer connected to a network such as the Internet to be made available for downloads via the network. Furthermore, the device management program executed in the device management apparatus 10 according to the embodiments may be provided or distributed over a network such as the Internet. Moreover, the device management program executed in the device management apparatus 10 according to the embodiments may be provided in a manner incorporated in a ROM or the like in advance.

The device management program executed in the device management apparatus 10 according to the embodiments has a modular structure including the units described above (the file receiving unit 11, the file analyzing unit 12, the storage controller 13, the screen generating unit 14, the change request receiving unit 15, the file generating unit 16, the file transmission unit 17, and the file reception unit 19). In the actual hardware, by causing the CPU (processor) to read the device management program from the storage medium and to execute the device management program, the units described above are loaded onto the main memory, and the file receiving unit 11, the file analyzing unit 12, the storage controller 13, the screen generating unit 14, the change request receiving unit 15, the file generating unit 16, the file transmission unit 17, and the file reception unit 19 are provided on the main memory.

The present invention is not limited to the embodiments as they are, and may be realized by making various changes and modifications without departing from the scope and spirit of the present invention in the practical phase. For example, the embodiments are examples in which the present invention is applied to the device management apparatus 10 whose target to be managed is the printing devices 20A to 20C connected to the network 40. However, the present invention can be widely applied to device management apparatuses whose target to be managed is various types of devices.

According to the present invention, a file describing setting items currently set and current setting values of the setting items is acquired from a plurality of devices. If the file thus acquired includes a setting item not being stored in a storage unit, the storage unit is caused to store therein the setting item not being stored in the storage unit and the current setting value of the setting item. Accordingly, it is possible to appropriately manage the devices to which a new setting item is added.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device management apparatus capable of communicating with a plurality of devices connected thereto via a network, the device management apparatus comprising:
   a storage unit that stores therein setting items and setting values for the devices;
   an acquiring unit that acquires, from an external device that is different from each of the devices, a file for each of the devices describing a setting item currently set in the device and a current setting value of the setting item, the acquiring unit acquiring the file for each of the devices after the external device has received the file from each of the devices;
   a determination unit that determines whether each of the acquired files acquired from the external device includes a setting item not being stored in the storage unit and further determines whether there is a difference in the setting items between the acquired files;
   a storage controller that causes the storage unit, when the determination unit determines that an acquired file of the acquired files acquired from the external device includes a setting item not being stored in the storage unit, to store therein the setting item and a current setting value of the setting item;
   a screen generating unit that generates, when the determination unit determines that there is a difference in the setting items between the acquired files acquired from the external device, a screen with a content obtained by merging the setting items and the current setting values thereof; and
   an instruction unit that, after the screen is generated,
      acquires, from the external device, a change request requesting rewrite of a setting value of a setting item in a designated device of the plurality of devices,
      generates, in a format processable by the designated device, a file including information for instructing the designated device to perform rewrite of the setting value,
      transmits the file to the designated device, and
      receives, from the designated device, a file reception result indicating that the file has been received.

2. The device management apparatus according to claim 1, wherein the generated screen is a screen through which a change request for changing a setting value being set in the designated device is input based on the file, and the screen generating unit causes the external device different from the devices to display the screen.

3. The device management apparatus according to claim 1, wherein the acquired files are in XML format, and
   a setting item corresponds to a setting of one of an email and a Simple Network Time Protocol (SNTP) server.

4. The device management apparatus according to claim 1, wherein the merging of the setting items and the current setting values thereof includes merging the setting items and the current setting values thereof in a single file in XML format.

5. A device management method performed in a device management apparatus that is capable of communicating with a plurality of devices connected thereto via a network, and that comprises a memory that stores therein setting items and setting values for the devices, the device management method comprising:
   acquiring for each of the devices, from an external device that is different from each of the devices, a setting item currently set in the device and a current setting value of the setting item, the acquiring the file for each of the devices after the external device has received the file from each of the devices;

determining whether each of the acquired setting items acquired from the external device is stored in the memory and further determining whether there is a difference in the setting items acquired for the devices from the external device;

causing, when the determining determines that an acquired setting item of the acquired setting items acquired from the external device is not stored in the memory, the memory to store therein the setting item and a current setting value of the setting item;

generating, when the determining determines that there is a difference in the setting items acquired from the external device, a screen with a content obtained by merging the setting items and the current setting values thereof; and after the generating of the screen,
    acquiring, from the external device, a change request requesting rewrite of a setting value of a setting item in a designated device of the plurality of devices,
    generating, in a format processable by the designated device, a file including information for instructing the designated device to perform rewrite of the setting value,
    transmitting the file to the designated device, and
    receiving, from the designated device, a file reception result indicating that the file has been received.

6. A device management apparatus capable of communicating with a plurality of devices connected thereto via a network, the device management apparatus comprising:

a storage unit that stores therein setting items and setting values for the devices;

an acquiring unit that acquires, from an external device that is different from each of the devices, a file for each of the devices describing a setting item currently set in the device and a current setting value of the setting item, the acquiring unit acquiring the file for each of the devices after the external device has received the file from each of the devices;

a determination unit that determines whether each of the acquired files acquired from the external device includes a setting item not being stored in the storage unit and further determines whether there is a difference in the setting items between the acquired files;

a storage controller that causes the storage unit, when the determination unit determines that an acquired file of the acquired files acquired from the external device includes a setting item not being stored in the storage unit, to store therein the setting item and a current setting value of the setting item;

a screen generating unit that generates, when the determination unit determines that there is a difference in the setting items between the acquired files acquired from the external device, a screen with a content obtained by merging the setting items and the current setting values thereof, the generated screen being a screen through which a change request for changing a setting value being set in a designated device is input based on the file, and the screen generating unit causing the external device to display the screen; and an instruction unit that, after the screen is generated,
    acquires, from the external device, a change request requesting rewrite of the setting value of the setting item in the designated device,
    generates, in a format processable by the designated device, a file including information for instructing the designated device to perform rewrite of the setting value,
    transmits the file to the designated device, and
    receives, from the designated device, a file reception result indicating that the file has been received.

\* \* \* \* \*